(12) United States Patent
Hsieh et al.

(10) Patent No.: US 6,751,435 B2
(45) Date of Patent: Jun. 15, 2004

(54) INTERMEDIATE TRANSFER MEMBER COMPRISING CHARGE TRANSPORT LAYER

(75) Inventors: Bing R. Hsieh, Webster, NY (US); Robert C. U. Yu, Webster, NY (US); Satchidanand Mishra, Webster, NY (US); T. Edwin Freeman, Webster, NY (US); Eugene A. Swain, Webster, NY (US); Anthony M. Horgan, Pittsford, NY (US); Huoy-Jen Yuh, Pittsford, NY (US); Geoffrey M. T. Foley, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 11 days.

(21) Appl. No.: 10/013,652

(22) Filed: Dec. 13, 2001

(65) Prior Publication Data

US 2003/0143362 A1 Jul. 31, 2003

(51) Int. Cl.[7] .................................................. B32B 3/10
(52) U.S. Cl. ........................ 399/302; 428/58; 474/253; 474/254
(58) Field of Search ................................. 474/253, 254; 428/58; 399/162, 302

(56) References Cited

U.S. PATENT DOCUMENTS

| | | | | |
|---|---|---|---|---|
| 5,587,224 A | * | 12/1996 | Hsieh et al. | 428/195 |
| 6,002,902 A | * | 12/1999 | Thornton et al. | 399/162 |
| 6,068,722 A | * | 5/2000 | Yu et al. | 156/137 |
| 6,289,196 B1 | * | 9/2001 | Hsieh et al. | 399/266 |

FOREIGN PATENT DOCUMENTS

| | | |
|---|---|---|
| EP | 0 620 507 A | 10/1994 |
| EP | 1 075 925 A | 2/2001 |

* cited by examiner

Primary Examiner—Alexander S. Thomas
(74) Attorney, Agent, or Firm—Annette L. Bade

(57) ABSTRACT

A seamed or seamless intermediate transfer member comprising a layer having an oxidized charge transport molecule, a charge transport molecule, or mixtures thereof, wherein in the seamed embodiment, the seam adhesive may also include an oxidized charge transport molecule, a charge transport molecule, or mixtures thereof.

24 Claims, 8 Drawing Sheets

INTERMEDIATE TRANSFER MEMBER COMPRISING CHARGE TRANSPORT LAYER

CROSS REFERENCE TO RELATED APPLICATIONS

Attention is directed to U.S. patent application Ser. No. 08/004,636 (D/97525) filed Jan. 8, 1998, entitled "Process and Apparatus for Producing an Endless Seamed Belt;" abandoned, U.S. patent application Ser. No. 09/615,444 (D/99598), filed Jul. 13, 2000, entitled "Polyimide Adhesive For Polyimide Component Interlocking Seams;" now U.S. Pat. No. 6,379,486 U.S. patent application Ser. No. 09,833, 507 (D/A0895Q), filed Apr. 11, 2001, entitled, "Conductive Carbon Filled Polyvinyl Butyral Adhesive pending;" U.S. patent application Ser. No. 09/833,488 (D/A0895Q1), filed Apr. 11, 2001, entitled, "Dual Curing Process for Producing a Puzzle Cut Seam now U.S. Pat. No. 6,638,383;" U.S. patent application Ser. No. 09,833,546 (A0584), filed Apr. 11, 2001, entitled, "Imageable Seamed Belts Having Polyamide Adhesive Between Interlocking Seaming Members pending;" U.S. patent application Ser. No. 09/838,507 (A0584Q), filed Apr. 11, 2001, entitled, "Polyamide and Conductive Filter Adhesive pending;" and U.S. patent application Ser. No. 10/013,665, filed Dec. 13, 2001, entitled "Oxidized Transport Transfer Member Coatings pending". The disclosures of each of these references are hereby incorporated by reference in their entirety.

BACKGROUND OF THE INVENTION

The present invention is directed to transfer members useful in electrostatographic, including digital apparatuses. In specific embodiments, the present invention is directed to seamed or seamless members. In embodiments, the present invention relates to xerographic component imageable seamed or seamless members comprising a charge transport layer. In embodiments, the charge transport layer may be a substrate, or may be a layer positioned on a substrate. In an embodiment, the charge transport layer comprises a charge transport molecule, an oxidized charge transport molecule, or mixtures thereof. The member, in embodiments wherein a seam is present, allows for image transfer at the seam, which cannot be accomplished with known seamed belts. Image transfer is accomplished partly because the present layer possesses the desired conductivity and release properties required for sufficient transfer. More specifically, in embodiments, the layer overcomes the narrow conductivity latitude problem, because the layer material provides controlled conductivity at changes in relative humidity, temperature and electrical cycling. In embodiments, the member is easily fabricated into a belt configuration due to the unique properties of the layer, which can be welded to form a seamed belt by ultrasonic means or by using solvent bonding or by heat fusion techniques. The charge transport layers can be manufactured with ease at high yields, also because the conductivity can be achieved reproducibly. In addition, the layers have many advantages over known layers such as the fact that they are stable over a wide range of changes, are frequency independent, are tunable, have homogeneous conductivity, have excellent wear resistance, exhibit low creep compliance under constant applied belt tension, and high dielectric strength.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The developer material is brought into contact with the electrostatic latent Image and the colored toner particles are deposited thereon in image configuration. In dry xerographic processes, the developer consists of polymer coated magnetic carrier beads and particles of thermoplastic toner materials with opposite tribo polarity relative to the carrier beads.

The developed toner image recorded on the imaging member surface is transferred to an image receiving substrate such as paper via an intermediate transfer member. The toner particles may be transferred by heat and/or pressure to an intermediate transfer member, or more commonly, the toner image particles may be electrostatically transferred to the intermediate transfer member by means of an electrical potential between the imaging member and the intermediate transfer member. After the toner has been transferred to the immediate transfer member, it is then transferred to the image receiving substrate, for example by contacting the substrate with the toner image on the intermediate transfer member under heat and/or pressure.

Employing intermediate transfer members enable high throughput at modest process speeds. In four-color photocopier or printer systems, the intermediate transfer member also improves registration of the final color toner image. In such systems, the four component colors of cyan, yellow, magenta and black may be synchronously developed onto one or more imaging members and transferred in registration onto an intermediate transfer member at a transfer station.

In electrostatographic printing and photocopy machines in which the toner image is transferred from the intermediate transfer member to the image receiving substrate, it is desired that the intermediate transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the intermediate transfer member.

Thus, it is desirable that the intermediate transfer member surface have excellent release characteristics with respect to the toner particles. Conventional materials known in the art for use as transfer members often possess the strength, conformability and electrical conductivity necessary for use as intermediate transfer members, but can suffer from poor toner release characteristics, especially with respect to higher gloss image receiving substrates.

Polyimide substrate intermediate transfer members in seamless belt form are suitable for high performance applications because of their outstanding mechanical strength and thermal stability, in addition to their good resistance to a wide range of chemicals. However, from manufacturing feasibility and cost considerations, seamless polyimide intermediate belt fabrication is limited only to the size of a 3-pitch belt. Therefore, in order to overcome the high cost of manufacturing unseamed polyimide belts has led to the introduction of a seamed belt.

In the electrostatic transfer applications, use of a seamed intermediate transfer polyimide intermediate transfer member belt results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. Also, incomplete image transfer at the seam area is largely the result of the composition and property discontinuity at the seam joint. Specifically, an adhesive material different from the polyimide substrate is normally necessary for bonding the two opposite mated ends of a polyimide sheet into a seamed intermediate transfer belt. The reason a different adhesive material is needed is because polyimide is itself a thermoset plastic, and therefore, cannot be welded into a seam joint by conventional ultrasonic welding processes. Polyimides can also not be welded into a seam by heat fusion techniques, by solvent bonding, or the like bonding means. The development of puzzle cut seams has increased the quality of image transfer somewhat, by decreasing the seam height, thereby allowing smooth cycling. However, even with the improvements made with puzzle cut seams, quality imaging in the seamed area is not obtainable at present due, in part, to contrast in transfer caused by differences in electrical and release properties between known seaming adhesives and substrates, because perfect matching of properties is difficult to achieve. Further, known polyimide substrates and puzzle cut seams have many problems, including weak seam rupture strength, the presence of non-imageable seam areas, narrow conductivity latitude, and electrical property easily affected by environmental conditions. In addition, polyimide is not easily fabricated into intermediate transfer member substrates, because it involves very complex material compounded processes.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

U.S. Pat. No. 6,318,223 discloses a process and apparatus for producing an endless seamed belt.

U.S. Pat. No. 6,358,347 discloses a continuous process for manufacturing imageable seamed belts for printers.

U.S. Pat. No. 6,316,070 discloses unsaturated carbonate adhesives for component seams.

U.S. Pat. No. 6,379,486 discloses a process for seaming interlocking seams of polyimide component using polyimide adhesive.

U.S. Pat. No. 6,327,454 discloses imageable seamed belts having fluoropolymer adhesive between interlocking seaming members.

U.S. Pat. No. 6,387,465 discloses imageable seam d belts having fluoropolymer overcoat.

U.S. Pat. No. 6,527,105 discloses imageable seamed belts having hot melt processable, thermosetting resin and conductive carbon filler adhesive between interlocking seaming members.

U.S. Pat. No. 6,289,196 discloses use of oxidized charge transport molecules as coatings for donor rollers. The disclosure of this patent is incorporated herein by reference in its entirety.

Therefore, it is desired to provide an intermediate transfer member layer, which is easily and more cost effectively fabricated with high yields using, for example, welding means, ultrasonic means, or solvent means. In addition, it is desired to provide an intermediate transfer layer that has a controlled conductivity and solves many or all of the narrow conductivity latitude problems. Moreover, it is desired to provide an intermediate transfer member having an imageable seam. It is further desired to provide an intermediate transfer member that has excellent wear characteristics.

U.S. Pat. No. 6,289,196 "Oxidized Transport Donor Roll Coatings," discloses use of oxidized charge transport molecules as coatings for donor rollers. The disclosure of this pending application is incorporated herein by reference in its entirety.

Therefore, it is desired to provide an intermediate transfer member layer, which is easily and more cost effectively fabricated with high yields using, for example, welding means, ultrasonic means, or solvent means. In addition, it is desired to provide an intermediate transfer layer that has a controlled conductivity and solves many or all of the narrow conductivity latitude problems. Moreover, it is desired to provide an intermediate transfer member having an imageable seam. It is further desired to provide an intermediate transfer member that has excellent wear characteristics.

SUMMARY OF THE INVENTION

Embodiments of the present invention include: an intermediate transfer apparatus comprising a) an image carrying charge retentive member capable of carrying a developed image to be transferred to an intermediate transfer member; b) an intermediate transfer member for accepting the developed image from the image carrying charge retentive member and transferring to an image accepting member; c) an image accepting member for accepting the developed image from the intermediate transfer member; the intermediate transfer member having a layer comprising a material selected from the group consisting of an oxidized charge transport molecule, a charge transport molecule, and mixtures thereof.

In addition, embodiments include: an intermediate transfer apparatus for transferring a developed image from a charge retentive surface to an image receiving member, wherein the intermediate transfer member comprises a substrate having a first end and a second end, each of the first end and the second end comprising a plurality of mutually mating elements which join in an interlocking relationship to form a seam, the seam comprising an adhesive, wherein the substrate and the adhesive both comprise a material selected from the group consisting of an oxidized charge transport molecule, a charge transport molecule, and mixtures thereof.

Moreover, embodiments include: an image forming apparatus for forming images on a recording medium comprising a charge-retentive surface to receive an electrostatic latent image thereon; a development component to apply toner to the charge-retentive surface to develop the electrostatic latent image to form a developed image on the charge retentive surface; an intermediate transfer member to transfer the developed image from the charge retentive surface to a receiving substrate, wherein the intermediate transfer member comprises a layer comprising a material selected from the group consisting of an oxidized charge transport molecule, a charge transport molecule and mixtures thereof; and a fixing component to fuse the developed image to the receiving substrate.

BRIEF DESCRIPTION OF THE DRAWINGS

For a better understanding of the present invention, reference may be made to the accompanying figures.

DETAILED DESCRIPTION OF THE PRESENT INVENTION

Figure 1:
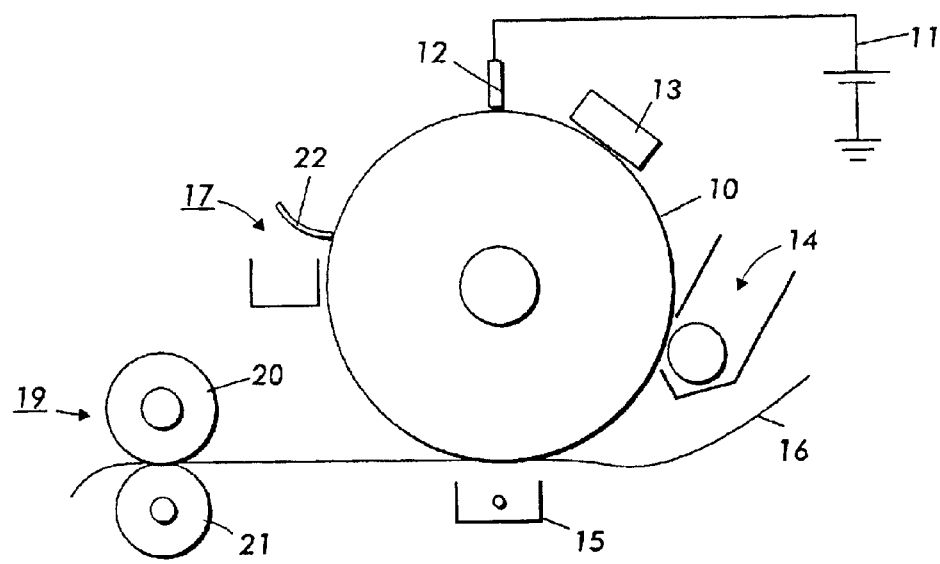
FIG. 1 is a depiction of an electrostatographic apparatus.

The present invention relates to an intermediate transfer member having a layer, wherein the layer comprises a charge transport material. In embodiments, the layer comprises a charge transport molecule, an oxidized charge transport molecule, or mixtures thereof. In other embodiments, the layer comprises a charge transport molecule, an oxidized charge transport molecule, and a polymer binder. In another embodiment, the layer comprises an oxidized charge transport molecule and a charge transport polymer. In yet another embodiment, the layer comprises a photoacid, a charge transport molecule and a polymer binder. In still another embodiment, the layer comprises a photoacid, a charge transport molecule and an ultraviolet curable material. In seamed embodiments, the seam adhesive also comprises a charge transport molecule, oxidized transport molecule, or mixtures thereof. In embodiments, the charge transport molecules, oxidized charge transport molecules, photoacid, and the like, are dispersed or dissolved in a film forming polymer binder matrix. In embodiments, the layer is a substrate.

In embodiments, the layer is used as a seamless intermediate transfer member substrate, or as an outer layer. In alternative embodiments, the layer is used as a seamed intermediate transfer substrate, or as an outer layer, wherein the seam is imageable and wherein the occurrence of copy and print defects at the seam is reduced or eliminated. Image transfer is accomplished partly because the present layer possesses the desired conductivity and release properties required for sufficient transfer. The present invention further provides, in embodiments, a member wherein the seam, when present, and belt material share the same electrical, mechanical and toner release characteristics.

The charge transport layers can be manufactured with ease at high yields, because the conductivity can be achieved reproducibly, and because the layers can be produced using ultrasonic welding techniques, heat fusion, and/or by using solvent bonding. In addition, the layers have many advantages over known layers such as the fact that they are stable over a wide range of changes, are frequency independent, are tunable, have homogeneous conductivity, have excellent wear resistance and high dielectric strength, less humidity sensitivity, and improved creep compliance resistance.

In embodiments, the member is an intermediate transfer belt, sheet, roller, or film useful in xerographic, including digital, apparatuses. However, the members herein comprising a charge transport material can be useful as belts, rollers, drelts (a drum/belt hybrid), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the members, herein, can be used for both liquid and dry powder xerographic architectures.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
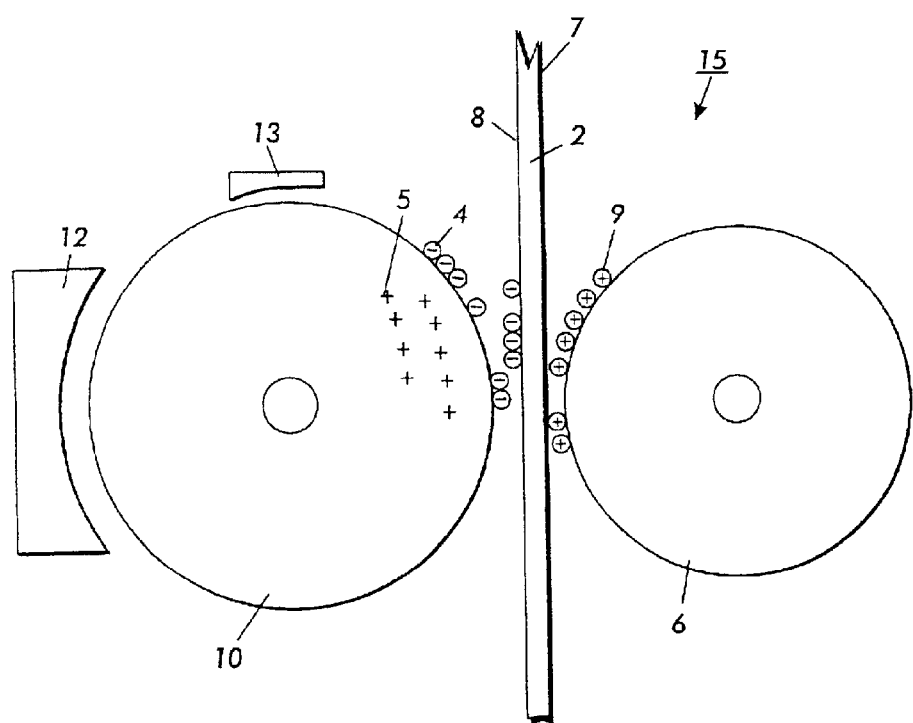
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 2 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In an embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2.

In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In an embodiment, the toner is present in a liquid developer. However, the present invention, in embodiments, is designed mostly for dry development systems.

A biased transfer roller 6 positioned opposite the photoreceptor drum 10 has a higher voltage than the surface of the photoreceptor drum 10. As shown in FIG. 2, biased transfer roller 6 contact charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
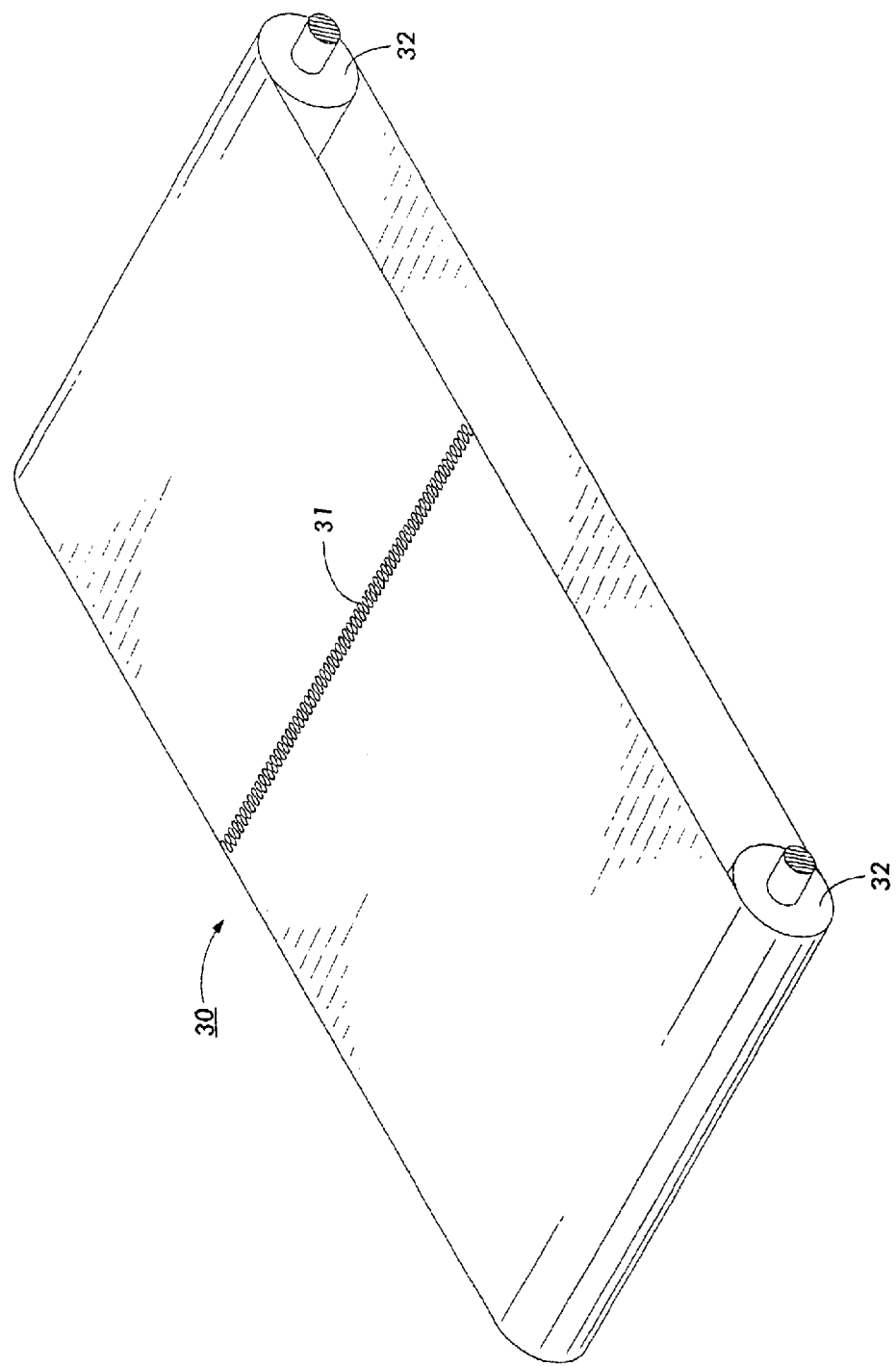
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. However, the member herein can be useful as a seamless member also. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

In embodiments wherein the intermediate transfer member comprises a seam, the seam is one having a thin and smooth profile, of enhanced strength, improved flexibility and extended mechanical life. In a specific embodiment, the belt ends are held together by the geometric relationship between the ends of the belt material, which are fastened together by an interlocking arrangement. In an embodiment, the interlocking seaming members are in a puzzle cut formation. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a resistive (controlled conductivity), hot-melt processable, thermosetting adhesive, which is compatible with the rest of the belt. The belt, in embodiments, provides improved seam quality and smoothness with substantially no thickness differential between the seam and the adjacent portions of the belt.

Figure 4:
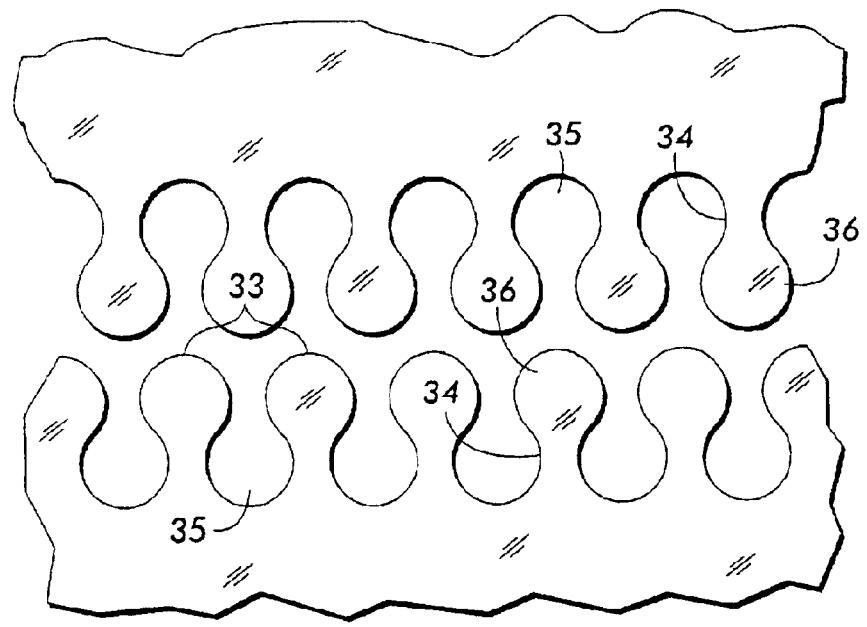
FIG. 4 is an enlargement of a puzzle cut seam having a head and neck member according to one embodiment of the present invention.
Figure 5:
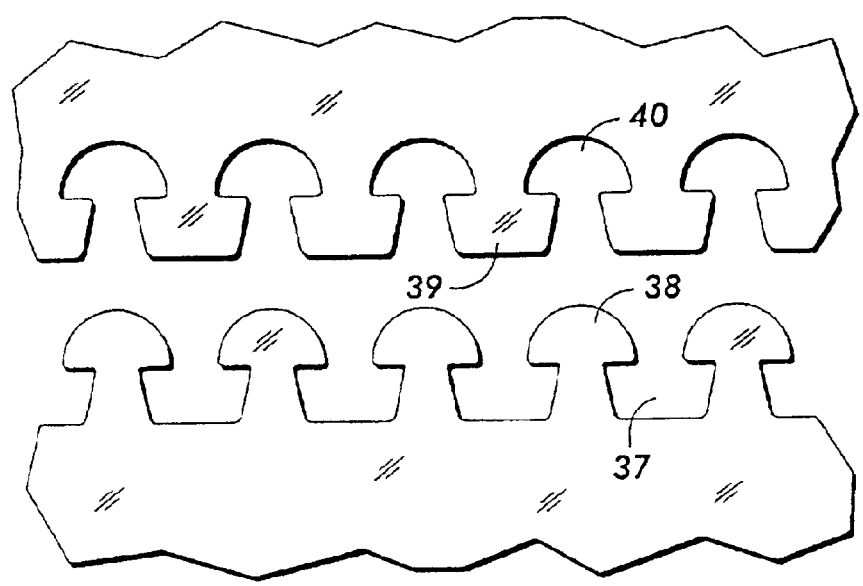
FIG. 5 is an enlargement of a puzzle cut seam having mushroom-shaped puzzle cut members according to another embodiment of the present invention.
Figure 6:
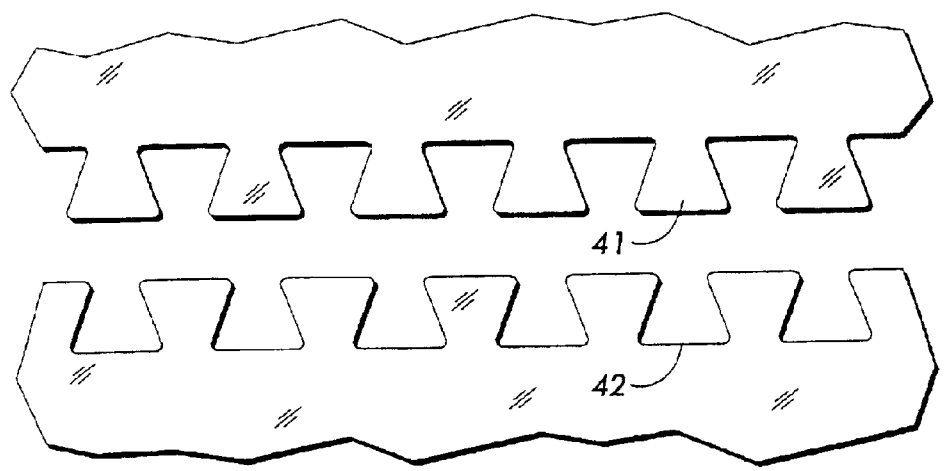
FIG. 6 is an enlargement of a puzzle cut seam having dovetail members according to another embodiment of the present invention.
Figure 7:
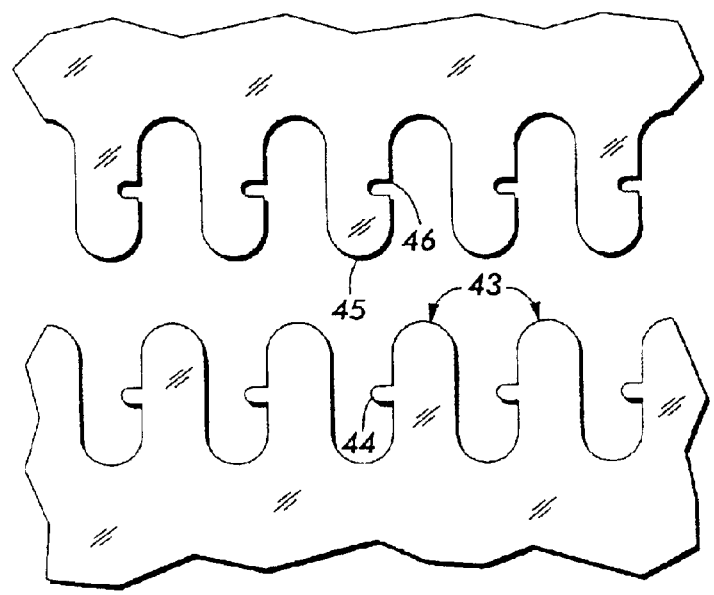
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. In embodiments, the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
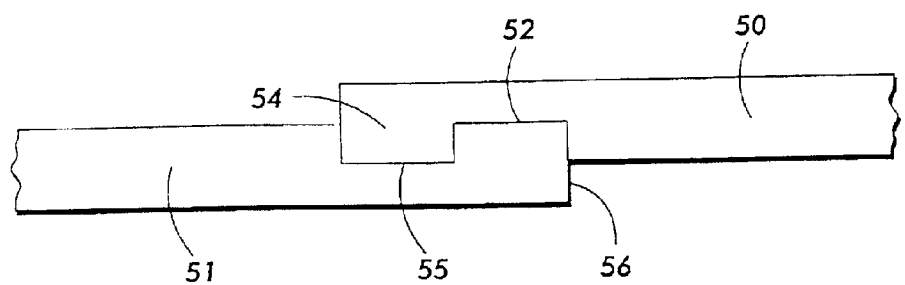
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt at the belt ends.

The height differential between the seam and the rest of the belt (the nonseamed portions of the belt) can be practically nil, or from about −25 to about +50 micrometers, or from about −5 to about +5 micrometers, or from about −1 to about +1 micrometers.

Figure 9:
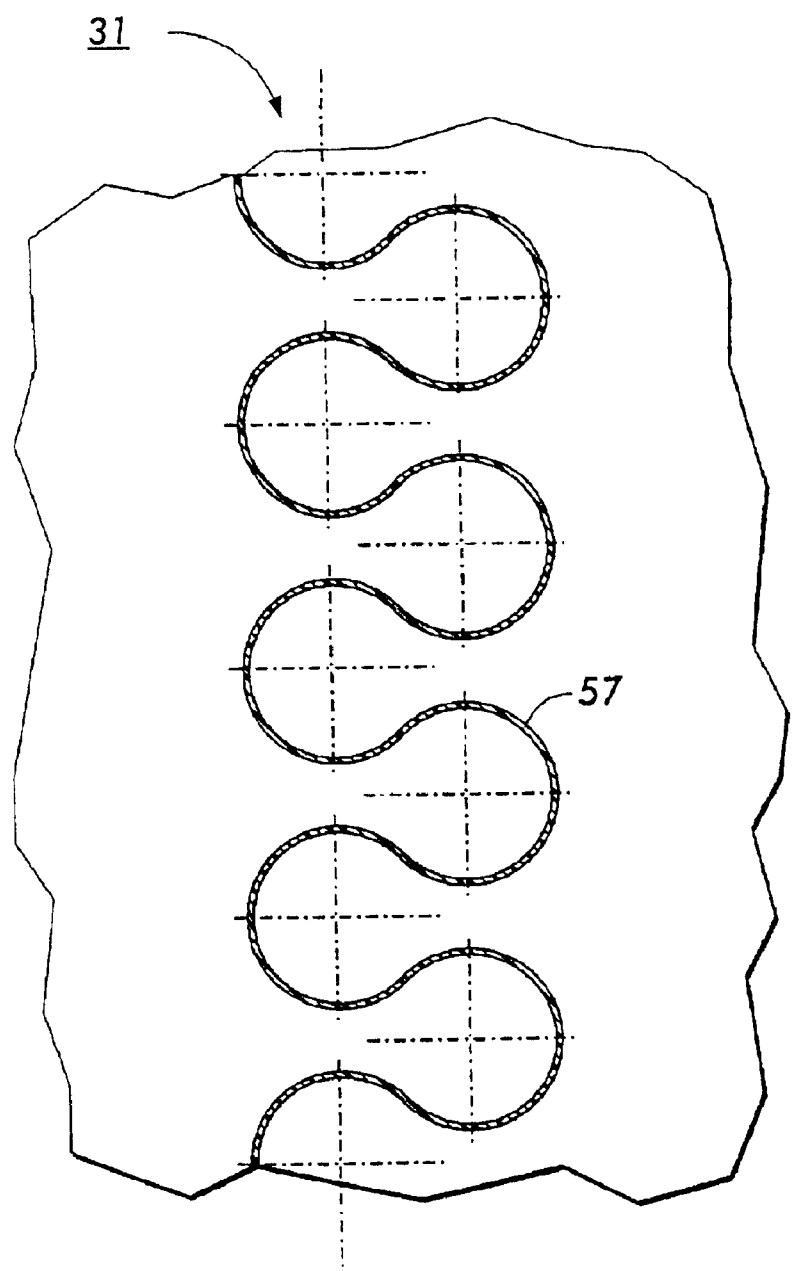
FIG. 9 is an enlarged version of a belt according to one embodiment of the present invention and demonstrates a crevice between the puzzle cut members, the crevice containing an adhesive.

An adhesive can be present between the seam, and placed in the crevice between the puzzle cut members to a thickness that fills the approximate 25 micrometers gap between the ends of the puzzle cut. As shown in one embodiment of a puzzle cut seam 31 according to the present invention, the adhesive is present between the puzzle cut members and at the seam crevice 57 of FIG. 9. The adhesive can comprise a charge transport molecule, oxidized charge transport molecule, or mixtures thereof.

In an embodiment wherein the intermediate transfer member comprises a seam, the adhesive is chosen to have a resistivity within the range desired for electrostatic transfer of toner. In embodiments, the resistivity of the seam is the same or similar to that of the belt member in order to provide the same electrical properties for the seam and the rest of the belt. A volume resistivity for toner transfer performance is from about $10^5$ to about $10^{12}$ ohm-cm, or from about $10^6$ to about $10^{10}$ ohm-cm or, from about $10^6$ to about $10^8$ ohm-cm. This is the volume resistivity for the seam and the rest of the belt. In embodiments, the adhesive makes good electrical contact with the belt material. When the belt and the seam of the belt have a same or substantially the same electrical resistance, the toner transfer at the seam is the same or substantially the same as the transfer at the belt. Such transfer at the seam provides an invisible or substantially invisible seam.

In one embodiment, the layer comprises a charge transporting molecule, an oxidized charge transporting molecule, or mixtures thereof. In an alternate embodiment, the layer comprises an oxidized transport molecule, a charge transport molecule and a polymer binder, wherein in embodiments, the oxidized transport molecule and charge transport molecule are molecularly dispersed or dissolved in a film forming polymer binder matrix. In another embodiment, the layer comprises a photoacid, a charge transport molecule, and a polymer binder. In yet another embodiment, the layer comprises a charge transport molecule, a photoacid, and an ultraviolet curable material such as an ultraviolet monomer or oligomer. In yet a further embodiment, the layer comprises an oxidized charge transport molecule and a charge transport polymer. In embodiments wherein the member comprises a seam, the adhesive can also comprises a charge transport molecule, an oxidized charge transport molecule, or mixtures thereof.

In addition to the above mentioned adhesive seaming approach, the intermediate transfer member of the present invention can conveniently be fabricated into a seamed belt, either by solvent bonding or heat fusion butt joining or by overlap ultrasonic welding with post seaming polish technique, to give an invisible and imageable seam without the need of an adhesive.

A charge transport molecule is a molecule that contains free carriers of electricity, in the form of holes or electrons, or both, or is capable of accepting charge carriers from an extrinsic source and allows migration of carriers in the presence of an electric field. When incorporated into a polymer matrix, such molecule imparts the ability to support the migration of charge carriers (electrons or holes) throughout the polymer matrix. The charge carriers can be generated extrinsically and then injected into the polymer matrix containing the charge transport molecule dispersion.

Alternatively, an oxidized charge transport molecule is a charge (hole) transport molecule that has been reacted with an oxidant, imparting electron transfer capability to the transport molecule, thus enhancing the semiconducting character. One could tune the conductivity of the material to suit a specific purpose by adjusting the concentrations of the charge transport molecule and the oxidant.

Suitable oxidized charge transport molecules include oxidized arylamine salts comprising a cation of an arylamine and a counter anion and oxidized oligo arylamine salts comprising the same. Examples of such arylamine salts include those having the formula TM-X or (TM)$_2$-Y, wherein TM is the cation of an arylamine charge transport molecule such as those listed above, and wherein X is a monovalent counter anion selected from the group consisting of $BF_4^-$, $PF_6^-$, $AsF_6^-$, $SbF_6^-$, $ClO_4^-$, $AuCl_4^-$, $C_{60}^-$, $I^-$, $Br_3^-$, $I_3^-$, $FeCl_4^-$, $SnCl_5^-$, $PO_3^-$, $(CF_3SO_3)_4Al^-$, $(CF_3SO_3)_4Ga^-$, $(CF_3SO_3)_4Ta^-$, $(CF_3SO_3)_4B^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, 2,2,2-trifluoroethanesulfonate, tetraphenylborate, anionic tetracyanoquinodimethane, and bis(trifluoromethanesulfonyl)imide; and Y is a divalent counter anion selected from the group consisting of $SiF_6^{2-}$, $GeF_6^{2-}$, $TiF_6^{2-}$, $TaF_7^{2-}$, $NbF_7^{2-}$, $RuCl_6^{2-}$, $OsCl_6^{2-}$, $IrCl_6^{2-}$, $PdCl_4^{2-}$, $PdCl_6^{2-}$, $PdI_6^{2-}$, $PtCl_4^{2-}$, $PtCl_6^{2-}$, $PtBr_6^{2-}$, $IrCl_6^{2-}$, $ZrF_6^{2-}$, squarate, benzenedisulfonate, $B_{12}H_{12}^{2-}$, and $C_{60}^{2-}$.

In embodiments, the oxidized arylamine salt is of a formula selected from the group consisting of:

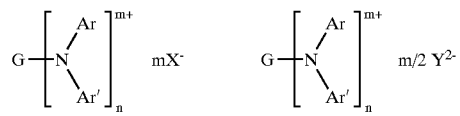

and mixtures thereof, wherein G is an aromatic group with from about 6 to about 24 carbon atoms and connects to all the diarylamine groups, Ar and Ar' are substituted or unsubstituted aromatic groups with from about 6 to about 18 carbon atoms, n is an integer of from about 2 to about 36, m is an integer which is less than or equal to n, $X^-$ is a monovalent counter anion selected from the group consisting of $BF_4^-$, $PF_6^-$, $AsF_6^-$, $SbF6^-$, $ClO_4^-$, $AuCl_4^-$, $C_{60}^-$, $I^-$, $Br_3^-$, $I_3^-$, $FeCl_4^-$, $SnCl_5^-$, $PO_3^-$, $(CF_3SO_3)_4Al^-$, $(CF_3SO_3)_4Ga^-$, $(CF_3SO_3)_4Ta^-$, $(CF_3SO_3)_4B^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, 2,2,2-trifluoroethanesulfonate, tetraphenylborate, anionic tetracyanoquinodimethane, and bis(trifluoromethanesulfonyl)imide; and $Y^{2-}$ is a divalent counter anion selected from the group consisting of $SiF_6^{2-}$, $GeF_6^{2-}$, $TiF_6^{2-}$, $TaF_7^{2-}$, $NbF_7^{2-}$, $RuCl_6^{2-}$, $OsCl_6^{2-}$, $IrCl_6^{2-}$, $PdCl_4^{2-}$, $PdCl_6^{2-}$, $PdI_4^{2-}$, $PtCl_4^{2-}$, $PtCl_6^{2-}$, $PtBr_6^{2-}$, $IrCl_6^{2-}$, $ZrF6^{2-}$, benzenedisulfonate, squarate, $B_{12}H_{12}^{2-}$, and $C_{60}^{2-}$.

In an embodiment of the invention, the oxidized arylamine salt is selected from the group consisting of p-TPD-X and p-(TPD)$_2$-Y where X and Y are mono and divalent counter anions, respectively, and p-TPD is the cation of a para-substituted triarylamine compound with at least one of the para-substituted terminal segments selected from the partial formulas:

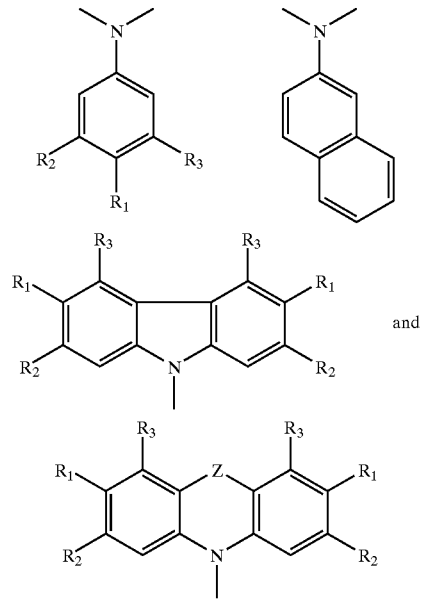

wherein $R_1$ is selected from the group consisting of bromine, chlorine, fluorine, alkyl groups with from about 1 to about 24 carbon atoms, such as methyl, ethyl, butyl, isobutyl, and the like, and alkoxy groups with from about 1 to about 24 carbon atoms, such as methoxy, ethoxy, butoxy, isobutoxy, and the like, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is an atom of O, S, Se, or a methylene substituent —CH$_2$—. In an embodiment, the arylamine salt is of the following formula:

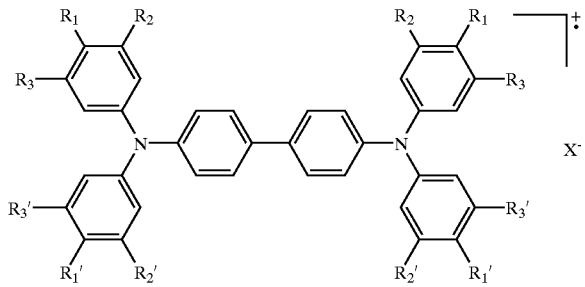

wherein R$_1$ and R$_1$' are bromine, chlorine, fluorine, alkyl groups with from about 1 to about 24 carbons, alkoxy groups with from about 1 to about 12 carbons, or aromatic groups with carbon number of from about 6 to about 24; R$_2$, R$_3$, R$_2$', and R$_3$' are independently selected from the group consisting of hydrogen, bromine, chlorine, fluorine, alkyl groups containing from about 1 to about 24 carbon atoms, and alkoxy groups having a carbon number of from about 1 to about 12, wherein X$^-$ is a monovalent counter anion selected from the group consisting of SbF$_6^-$, BF$_4^-$, PF$_6^-$, AsF$_6^-$, ClO$_4^-$, AuCl$_4^-$, CO$_{60}^-$, I$^-$, Br$_3^-$, I$_3^-$, FeCl$_4^-$, SnCl$_5^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, and 2,2,2-trifluoroethane-sulfonate. In an embodiment, X— is selected from the group consisting of SbF6$^-$ and AsF6$^-$.

Another example of an oxidized charge transport molecule is an oligo arylamine salt. Oligomer includes dimers, trimers, tetramers and the like oligomers. In an embodiment, the oligo arylamine salt is of the following formula:

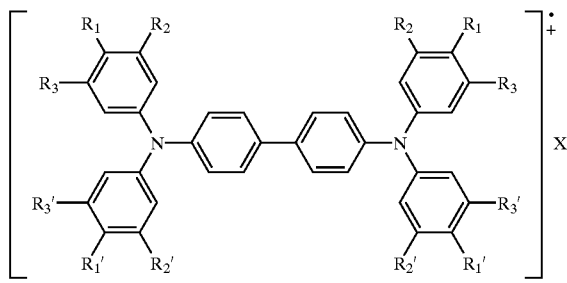

wherein R$_1$ and R$_1$' are bromine, chlorine, fluorine, alkyl groups with from about 1 to about 24 carbons, alkoxy groups with from about 1 to about 12 carbons, or aromatic groups with carbon number of from about 6 to about 24; R$_2$, R$_3$, R$_2$', and R$_3$' are independently selected from the group consisting of hydrogen, bromine, chlorine, fluorine, alkyl groups containing from about 1 to about 24 carbon atoms, and alkoxy groups having a carbon number of from about 1 to about 12, wherein X$^-$ is a monovalent counter anion selected from the group consisting of SbF$_6^-$, BF$_4^-$, PF$_6^-$, AsF$_6^-$, ClO$_4^-$, AuCl$_4^-$, C$_{60}^-$, I$^-$, Br$_3^-$, I$_3^-$, FeCl$_4^-$, SnCl$_5^-$, trifluoroacetate, benzoate, nitrobenzoate, toluenesulfonate, p-bromobenzenesulfonate, p-nitrobenzenesulfonate, trifluoromethanesulfonate, nonafluorobutanesulfonate, and 2,2,2-trifluoroethane-sulfonate. In an embodiment, X— is selected from the group consisting of SbF6$^-$ and AsF6$^-$. The non-oligo arylamine salt is of the same formula as above, absent the brackets demonstrating the oligo nature of the molecule.

A specific example of an oxidized charge transport molecule is CAT® 196, available from Xerox Corporation (See U.S. Pat. No. 5,587,224, the subject matter of which is hereby incorporated by reference in its entirety.) The formula is shown below. The oligomer version of the below formula is another example of a suitable oxidized charge transport molecule, and would be shown as the formula below having brackets around the molecule to indicate it is an oligomer.

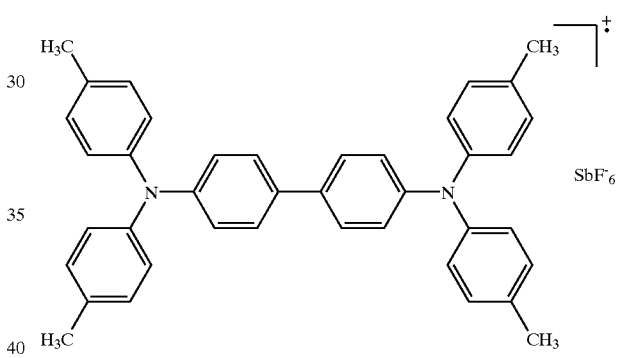

The oxidized charge transport molecule is present in the layer in an amount of from about 0.1 to about 10 percent by weight, or from about 0.5 to about 3 weight percent of total solids. Total solids as used herein refers to the total amount by weight of oxidized charge transport molecules, charge transport molecules, photoacids, polymer binders, ultraviolet curable materials, charge transport polymer and/or charge transport polymer binders, and other like solid materials.

The charge transporting molecules can be any known charge transporting molecules such as those described in U.S. Pat. Nos. 5,264,312; 4,338,222; 5,386,277; 5,448,342 and 5,587,224, the disclosures each of which are totally incorporated by reference herein in their entirety.

Examples of charge transport materials, either molecular doped into a polymer binder, or incorporated into polymeric structures, are para-substituted arylamine charge transport compounds.

The charge transport compound can be an arylamine of the following alternative formulas:

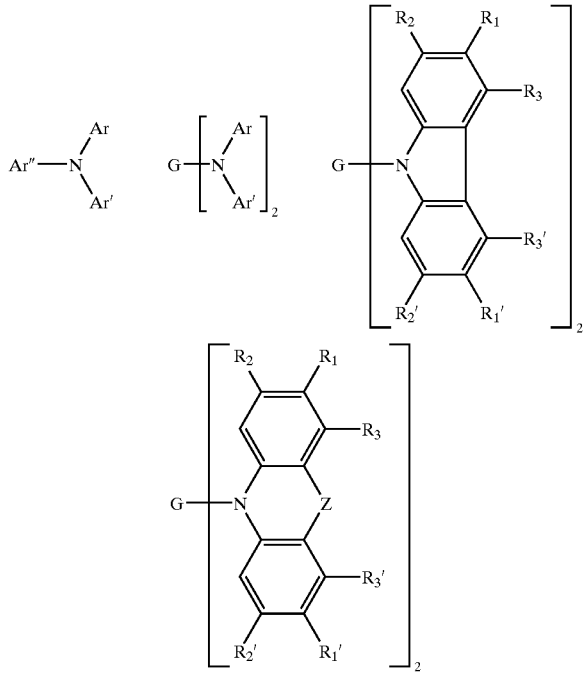

wherein Ar, Ar', and Ar" are independently selected from unsubstituted and substituted aromatic groups with from about 6 to about 30 carbon atoms, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-fluorophenyl, 4-phenylphenyl, 2-naphthyl, 1-naphthyl, and the like, and mixtures thereof, and $R_1$, $R_2$, $R_3$, $R_1'$, $R_2'$, and $R_3'$ are independently selected from the group consisting of hydrogen, bromine, chlorine, fluorine, alkyl groups with from about 1 to about 24 carbon atoms such as methyl, ethyl, propyl, butyl, isobutyl, and the like, and alkoxy groups with from about 1 to about 24 carbon atoms such as methoxy, ethoxy, isobutoxy, and the like, Z is selected from the atoms O, S, Se, or a substituent —$CH_2$—, and G is an alkylene group with from about 1 to about 12 carbon atoms or a group selected from the partial formulas:

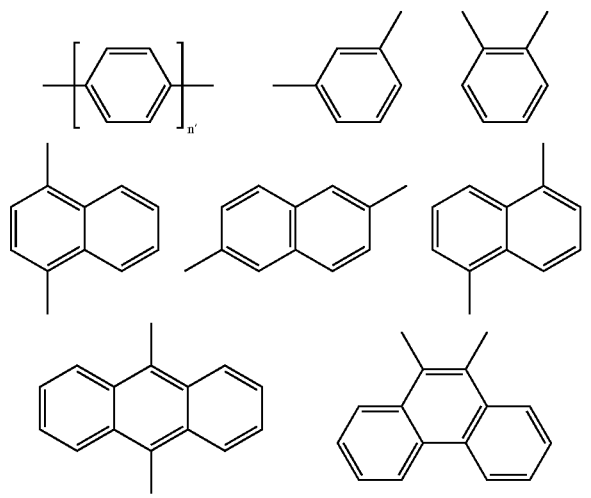

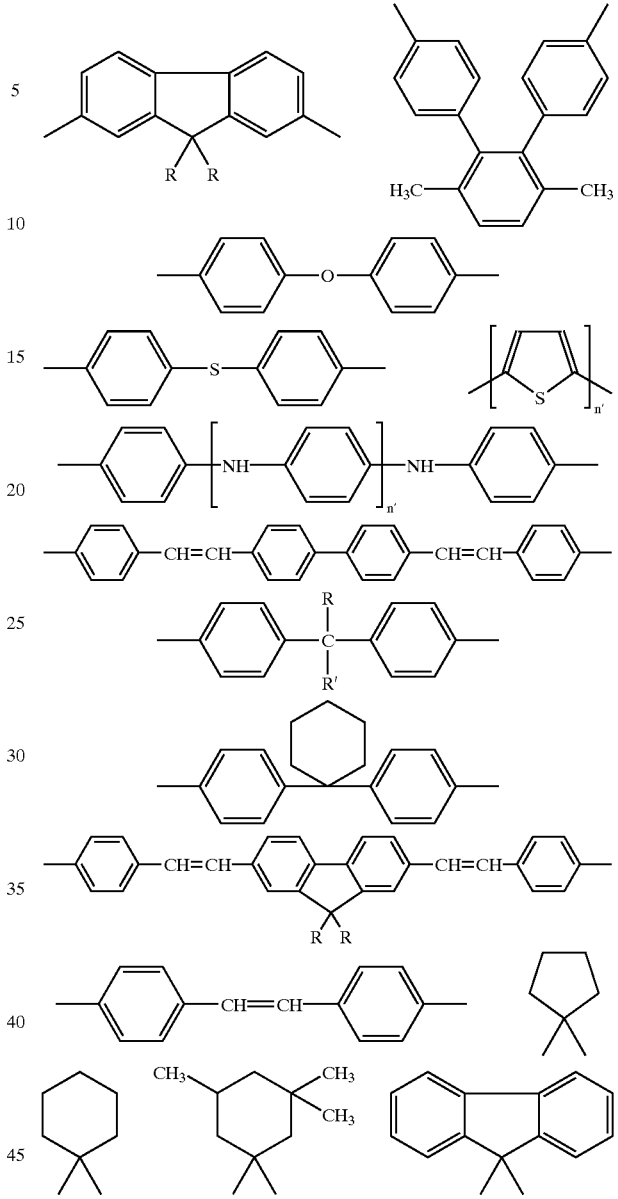

wherein n' is an integer of from about 1 to about 12, and R and R' are alkyl groups with, for example, from about 1 to about 12 carbon atoms such as methyl, ethyl, propyl and the like.

The charge transport compound can include the following arylamine compounds and mixtures thereof:

a) aryldiamine compounds of the formula:

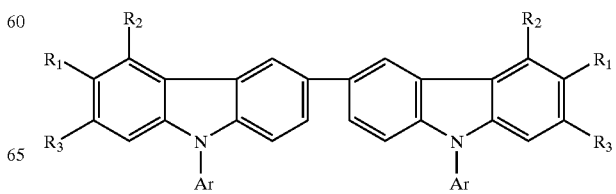

-continued

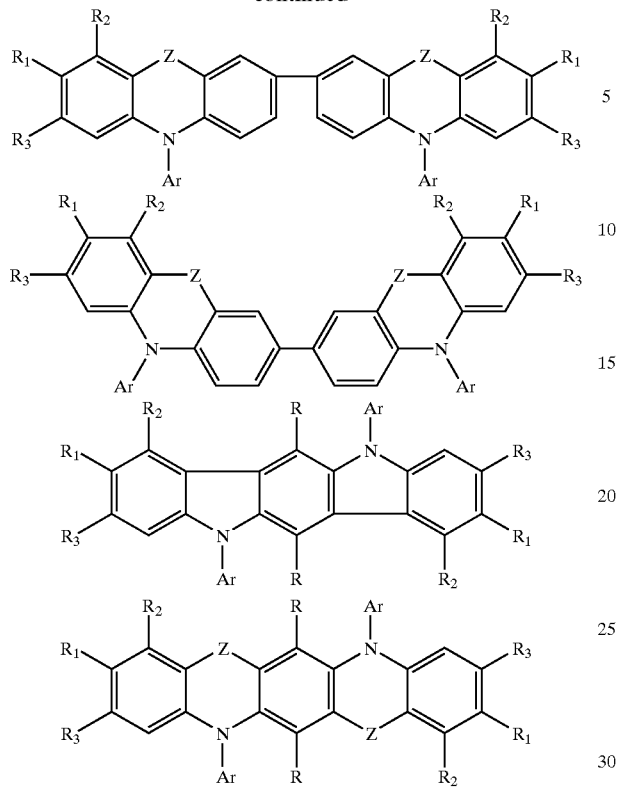

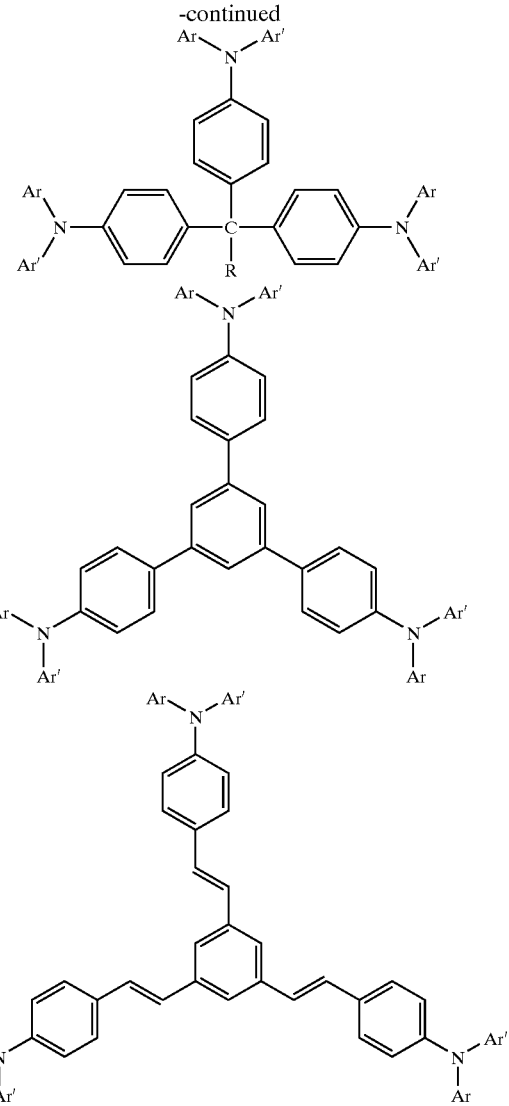

wherein Ar is a substituted or unsubstituted aromatic group, for example, phenyl, 3-methylphenyl, 4-methylphenyl, 3,4-dimethylphenyl, 4-ethylphenyl, 4-t-butylphenyl, 4-methoxyphenyl, 4-bromophenyl, 4-chlorophenyl, 3-iodophenyl, 4-fluorophenyl, 4-phenylphenyl, 2-naphthyl, 1-naphthyl, and the like, and mixtures thereof, $R_1$, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is selected from an atom O, S, Se, or a methylene substituent —CH$_2$—;

b) aryltriamines compounds of the formula:

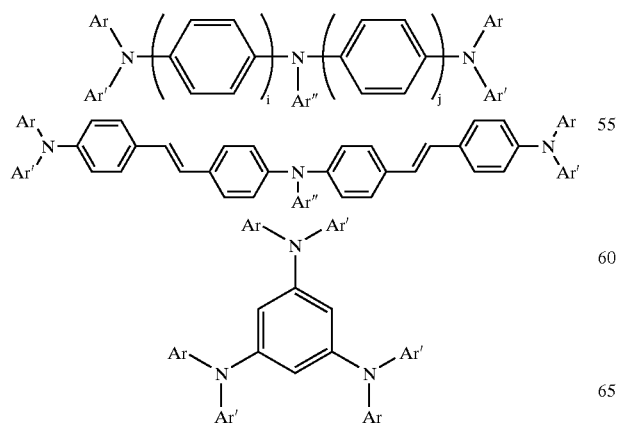

wherein Ar and Ar' are independently selected from substituted and unsubstituted aromatic groups, R is selected from hydrogen, phenyl containing from about 6 to about 20 carbon atoms and alkyl groups containing from about 1 to about 12 carbon atoms, and wherein i and j are integers of from about 1 to about 2;

c) aryltetraamines compounds of the formula:

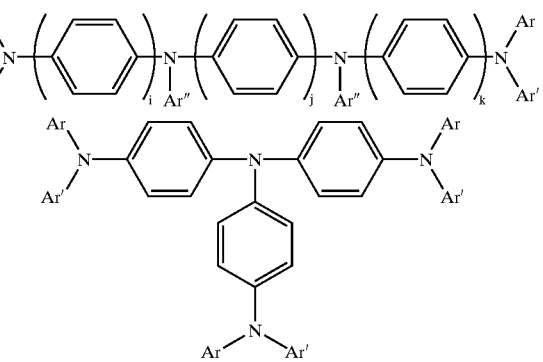

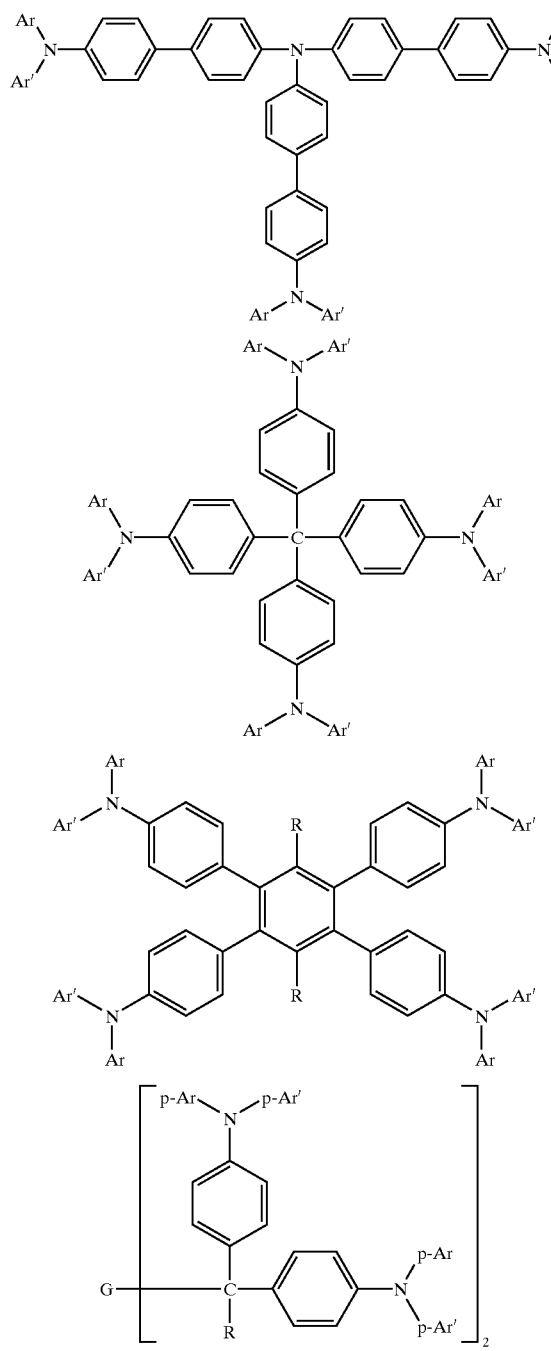

wherein Ar, Ar', and Ar" are independently selected from substituted and unsubstituted aromatic groups with from about 6 to about 20 carbon atoms, p-Ar and p-Ar' are independently selected from para-substituted aromatic groups with from about 6 to about 20 carbon atoms, R is selected from hydrogen, phenyl with from about 6 to about 20 carbon atoms and alkyl groups containing from about 1 to about 12 carbon atoms, i, j, and k are integers 1 or 2, G is an alkylene group with from about 1 to about 12 carbon atoms such as methylene, ethylene, propylene, butene and the like, or a group selected from the partial formulas:

wherein n' is an integer from about 1 to about 12, and R and R' are alkyl groups with from about 1 to about 12 carbon atoms;

d) arylpentaamines compounds of the formula:

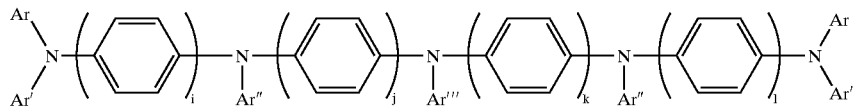

wherein Ar, Ar', Ar", and Ar'" are independently selected from substituted and unsubstituted aromatic groups with from about 6 to about 20 carbon atoms, and i, j, k, and l are integers of 1 or 2; and e) arylhexaamines compounds of the formula:

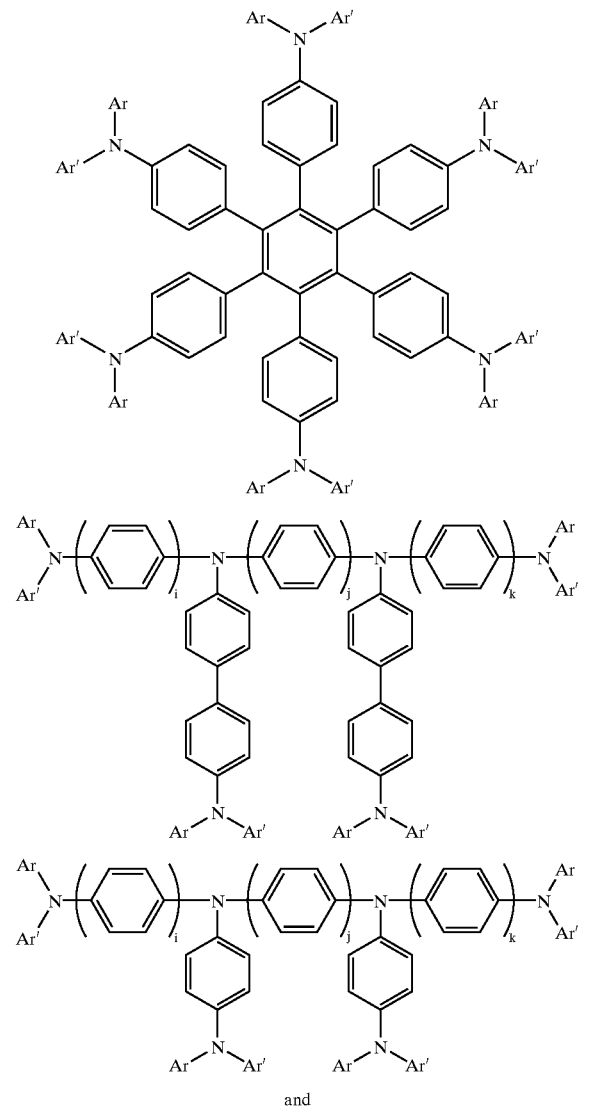

and

-continued

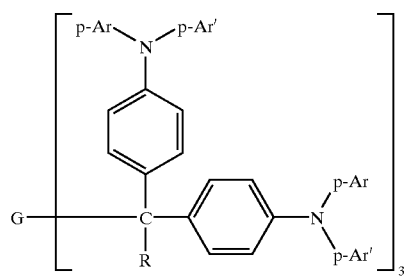

wherein Ar and Ar' are independently selected from substituted and unsubstituted aromatic groups with from about 6 to about 20 carbon atoms, p-Ar and p-Ar' are para-substituted aromatic groups with from about 6 to about 20 carbon atoms, i, j, and k are integers of 1 or 2, G is a alkylene group with from about 1 to about 12 carbon atoms or an aromatic group selected from the formulas:

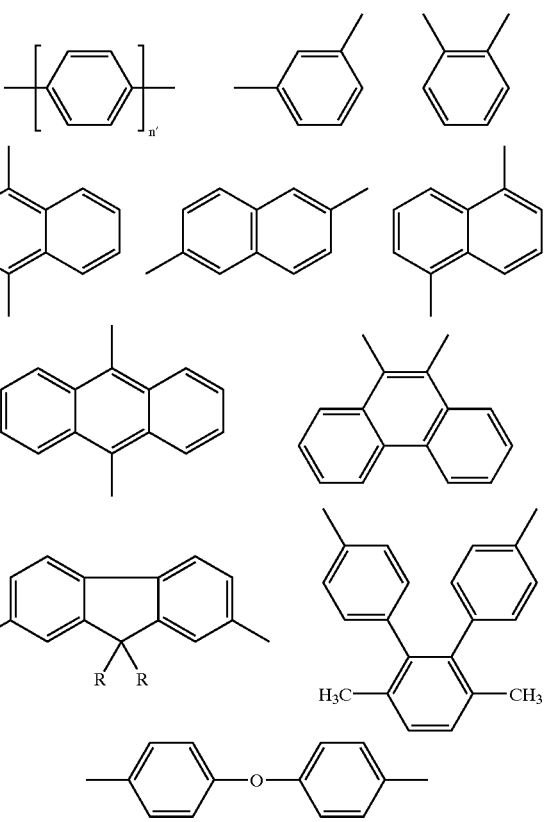

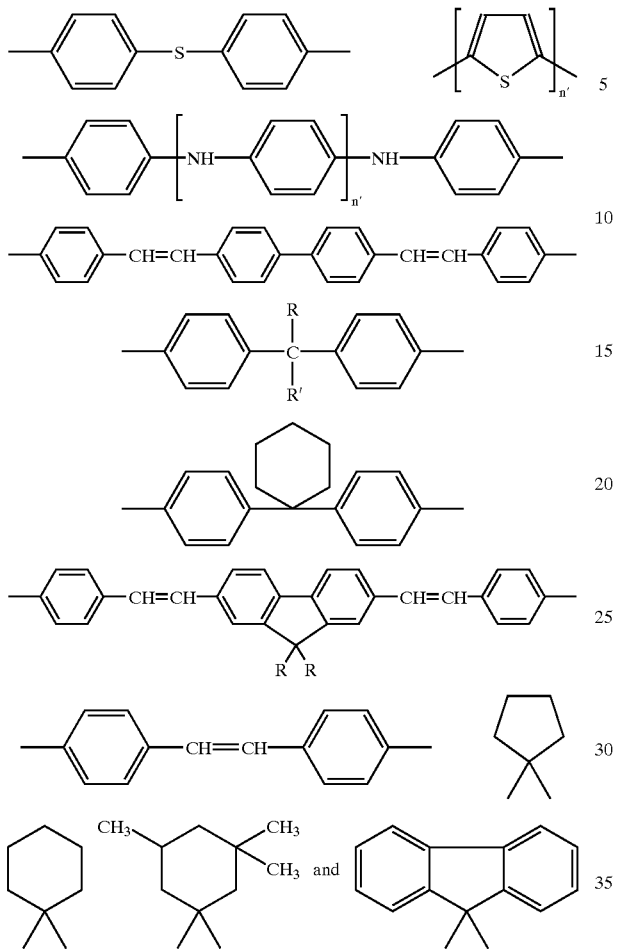

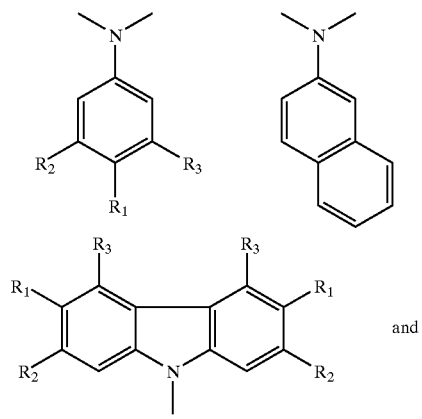

wherein n' is an integer from about 1 to about 12, and R and R' are alkyl groups with from about 1 to about 12 carbon atoms.

The arylamine charge transport compound can be para-substituted triarylamine compounds with at least one of the para-substituted molecular segments selected from the partial formulas:

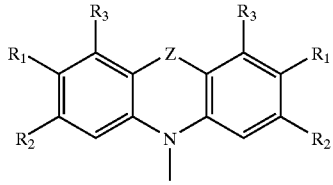

wherein $R_1$ is selected from the group consisting of bromine, chlorine, fluorine, alkyl groups with from about 1 to about 24 carbon atoms, and alkoxy groups with from about 1 to about 24 carbon atoms, $R_2$ and $R_3$ are independently selected from the group consisting of hydrogen, bromine, chlorine, fluorine, alkyl groups with from about 1 to about 24 carbon atoms, and alkoxy groups with from about 1 to about 24 carbon atoms, and Z is an atom of O, S, Se, or a methylene substituent —$CH_2$—.

Specific examples of charge transport molecules include N,N'-diphenyl-N,N'-bis(m-methylphenyl)-(1,1'-biphenyl)-4,4'-diamine (TPD or m-TBD) and N,N,N',N'-tetra-p-tolyl-1,1'-biphenyl-4,4'-diamine (TM-TPD). A suitable charge transport molecule includes a meta-substituted dimethyl TPD such as that having the formula:

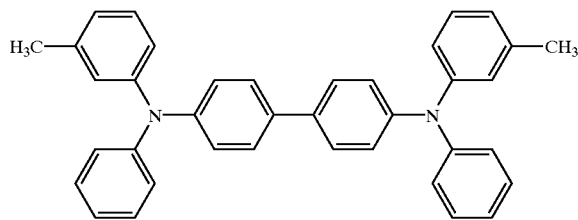

wherein the oxidized form of the substituted arylamine charge transport compound results from photo-oxidation with photo-oxidants such as diphenyliodonium salts and diarylsulfonium salts.

The charge transport molecule is present in the layer in an amount of from about 1 to about 70 percent by weight, or from about 20 to about 50 percent by weight of total solids.

A charge transport polymer, in embodiments, is selected from polymers that contain a para-substituted aryldiamine unit of the formula:

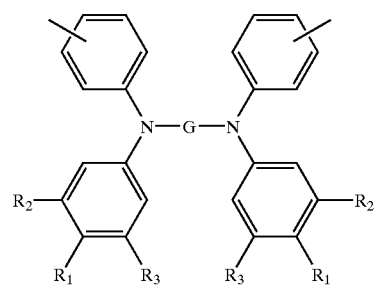

wherein $R_1$ is selected from the group consisting of bromine, chlorine, fluorine, alkyl groups containing from about 1 to about 24 carbon atoms, and alkoxy groups containing from about 1 to about 24 carbon atoms, $R_2$ and $R_3$ are independently selected from the group consisting of hydrogen, bromine, chlorine, fluorine, alkyl groups containing from about 1 to about 24 carbon atoms, such as methyl, ethyl, butyl, isobutyl, cyclohexyl, and the like, and alkoxy groups containing from about 1 to about 24 carbon atoms, G is selected from the group consisting of alkaline groups of from about 1 to about 12 carbon atoms and of the formulas:

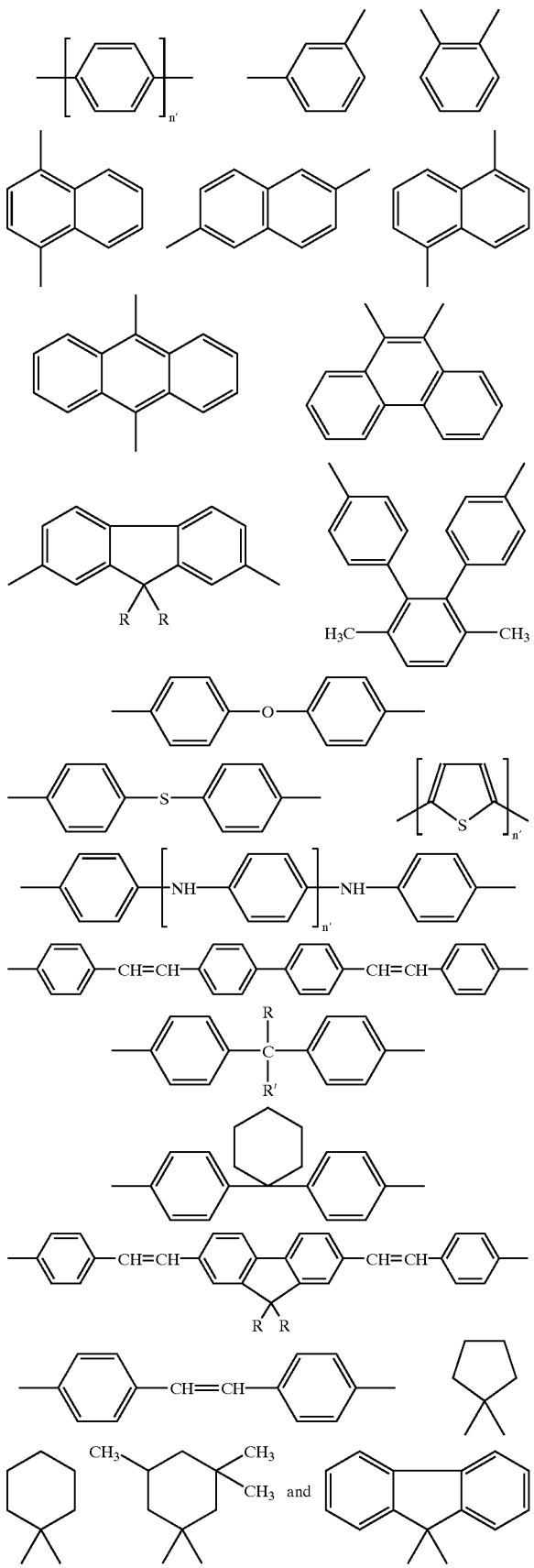

wherein n' is an integer of from about 1 to about 12, and R and R' are alkyl groups with from about 1 to about 12 carbon atoms. Other examples of charge transport polymers include PEC (polyether carbonate), polyvinylcarbazole, triarylamine doped polycarbonate, triphenylamine-containing poly(N-methylacrylimide and polysilanes.

The charge transport polymer is present in the layer in an amount of from about 40 to about 99 percent by weight, or from about 60 to about 80 percent by weight of total solids.

Polymer binder, as used herein, is an insulative dielectric polymer resin that serves as a matrix for the charge transport molecule. The polymer binder, in embodiments, includes thermoplastics such as polystyrenes, polycarbonates, polysiloxanes, polyesters, polyimides, polyurethanes, polysulfones, polyethersulfones, polyether ketones, polyamides, thermoplastic elastomers, and mixtures thereof. An example of a commercially available polymer binder is the polyimide ULTEM® from General Electric, Schenactady, N.Y.

The polymer binder is present in the layer in an amount of from about 30 to about 99 percent by weight, or from about 60 to about 75 percent by weight of total solids.

A photoacid, as used herein, is an compound, which is otherwise dormant, but becomes oxidative when activated by light (photo-oxidation). Examples of photoacids include anionic salts of the formula AX, wherein A is a cation ion selected, for example, from the group consisting of diaryliodosonium, triarylsulfoxonium, pyrylium, thiapyrilium, phelylacyldialkylsofonium, phenylacyldiakylamonium, quinolinium, phenylacyltritriphenylphosphonium, ferrocinium, coboltocinium, and wherein X is an anion selected, for example, from the group consisting of chloride, bromide, iodide, hexafluoroantimonate, hexafluoroarsenate hexafluorophosphate, tetrafluoroborate, trifluoroacetate, triflate, toluenesulfonate, nitrobenzenesulfonate, camphorsulfonate, and dodecylsulfonate. A specific example of a photoacid is di(p-t-butylphenyl) iodonium hexafluoroarsenate. Alternatively, the photoacid can be nonionic, latent organic acid generating compounds, for example, α-sulfonyloxyketones, 2,6-dinitrobenzyl mesylate, 2,6-dinitrobenzyl pentafluorobenzenesulfonate, nitrobenzyltriphenylsilylether, phenyl najphthoquininediazide-4-sulfonate, 2-phenyl-4,6-bis-trichloromethyl-s-triazine and mixtures thereof. (See J. V. Crivello & K. Dietliker in "Chemistry and Technology of UV and EB Formulation for Coatings, inks and Paints", P. K. Olsring ED., Selective Industrial Training Associates Ltd., London, UK, 1991, Chapter 3).

The photoacid is present in the layer in amounts of from about 1 to about 50 percent by weight of the charge transport molecule, or from 2 to about 15 percent by weight of the charge transport molecule. However, the desired concentration depends on the resistivity requirement of the belt layer material.

UV curable materials are materials that are capable of undergoing light-induced chain reactions (usually in the presence of a photoinitiator), activated by the absorption radiation in the ultraviolet range of the electromagnetic spectrum. The ultraviolet curable material includes ultraviolet curable monomers, polymers, oligomers, and mixtures thereof. Examples of suitable ultraviolet curable materials include acrylates, methacrylates, epoxies, vinyl monomers, epoxy acrylates, urethane acrylates, polyether urethane acrylates, polyester acrylates, polyether acrylates, acrylated oils, thiols, and the like, and mixtures thereof.

The ultraviolet curable material is present in the layer in amounts of from about 30 to about 99 percent, or from about 60 to about 75 percent by weight of total solids.

One procedure for preparing a UV curable layer comprises dissolving the charge transport molecule, UV curable material and the oxidized charge transport molecule in a suitable solvent, followed by addition of the photoacid and, stirring to assure a uniformed distribution with total dissolution of all the components to form a homogeneous solution. The solution is then extrusion coated over a release support, for example about 10 mil thick polyethylene terephthalate support web, followed by drying the wet coating at elevated temperature, of for example, about 120° C., to rid the solvent. Subsequently, the coating is exposed expose to UV irradiation to polymerize and cure the coating into a flexible crosslinked transfer layer web stock.

In an embodiment wherein the intermediate transfer member comprises a seam, the adhesive for the seam can comprise a charge transport molecule, an oxidized charge transport molecule, or mixtures thereof. In embodiments, the adhesive can comprise the same or similar ingredients as the charge transport layer. Therefore, in one embodiment, the adhesive for use with the seamed member comprises a charge transporting molecule, an oxidized charge transporting molecule, or mixtures thereof. In an alternate embodiment, the adhesive comprises an oxidized transport molecule, a charge transport molecule and a polymer binder. In another embodiment, the adhesive comprises a photoacid, a charge transport molecule, and a polymer binder. In yet another embodiment, the adhesive comprises a charge transport molecule, a photoacid, and an ultraviolet material such as an ultraviolet monomer or oligomer. In yet a further embodiment, the adhesive comprises an oxidized charge transport molecule and a charge transport polymer.

The adhesive in solution may be applied at the seam and between interlocking seaming members, by any suitable means including liquid means such as using a cotton-tipped applicator, liquid dispenser, glue gun or the like, or by dry processes such as by using a dry tape. An amount in slight excess of the amount of adhesive sufficient to fill the seam when dry is added between interlocking seaming members.

The adhesive can be prepared by known methods, or by compounding the material ingredients together with the appropriate solvents to form the film solution. The adhesive film composite, with or without a removable release backing, is then applied to align with only the puzzle-interlocked seamed region of the belt or film member. The seam is then pressed between parallel heated plates, for example the jaws of a Vertrod seam welder. The seam can then be cured by various methods. Curing procedures useful in curing the seam include thermal curing and infrared curing. Examples of heat curing include use of moderate to high heat once the adhesive is placed in the seam crevice. This heating also induces the crosslinking/solidification reaction and increases the seam processing and belt fabrication speed. Desired temperature includes from about 40 to about 250° C., or from about 100 to about 150° C., at a time of from about 30 seconds to about 24 hours, or from about 5 minutes to about 2 hours, or from about 5 minutes to about 15 minutes. The pressure during the heat curing is from about 0.5 psi to about 100 psi, or from about 2 psi to about 60 psi. Increased pressure enables welding at lower temperatures and vise versa. Heat may be applied by, for example, a welder, heat gun, oven, or other suitable means.

In some cases, a second post-cure is carried out in order to sufficiently crosslink the lower molecular weight oligomers into a higher molecular weight polymeric network. The second post cure occurs at a higher temperature than the first cure. The temperature of the second cure is from about 120 to 200° C. at a time of from about 30 seconds to about 24 hours, or 20 minutes to about 1 hour, and at a pressure of from about 0.5 psi to about 100 psi, or from about 2 psi to about 10 psi.

In an optional embodiment of the invention, an overcoat is coated on the adhesive. The overcoat can cover only the seam in embodiments wherein the member is seamed, or can cover the entire layer, in seamless and seamed embodiments. Suitable overcoats include fluoropolymers, silicones, vinyl butyral composites, the charge transport compositions described herein, and the like overcoats. The overcoat on a substrate is required to have substantially identical electrical resistivity to the substrate as well as good adhesive bonding to the substrate.

In embodiments, a filler can be added to the layer and/or to the adhesive. Examples of suitable fillers include carbon fillers such as graphite, carbon black, fluorinated carbon such as ACCUFLUOR® or CARBOFLUOR® from Advance Research Chemicals, Caroosa, Okla., and like carbon fillers, and mixtures thereof; metal oxide fillers such as copper oxide, iron oxide, magnesium oxide, and the like, and mixtures thereof; doped metal oxide fillers such as antimony doped tin oxide (for example, ZELEC®), and the like, and mixtures thereof; other conductive filers, and the like, and mixtures thereof. Other fillers may be used, such as fillers having a purpose of altering the surface and mechanical properties. These include polytetrafluoroethylene powder, microcrystalline silica, and the like. A specific example of a filler is ZONYL® polytetrafluoroethylene powder available from DuPont or POLYMIST® powder available from Ausimont. Other examples include microcrystalline silica available from Malvern Minerals.

In embodiments, a substrate is present and the charge transport layer is positioned thereon. Suitable materials for the substrate in these embodiments include engineering plastics such as polyimide, polysulfone, polyphenylene sulfide, polyether sulfone, polyamide, and the like. The substrate may include fillers such as those listed above. A specific example is a carbon filler. The transport layer can be deposited on the substrate by roll to roll solvent coating process on a roll substrate, following by any known seaming process such as heat welding, puzzle cut seaming, and the like. The transport layer can also be deposited on seamless belt substrates by any known solvent coating process, such as spray coating or dip coating.

In other embodiments, the substrate itself comprises the charge transport material.

Figure 10:
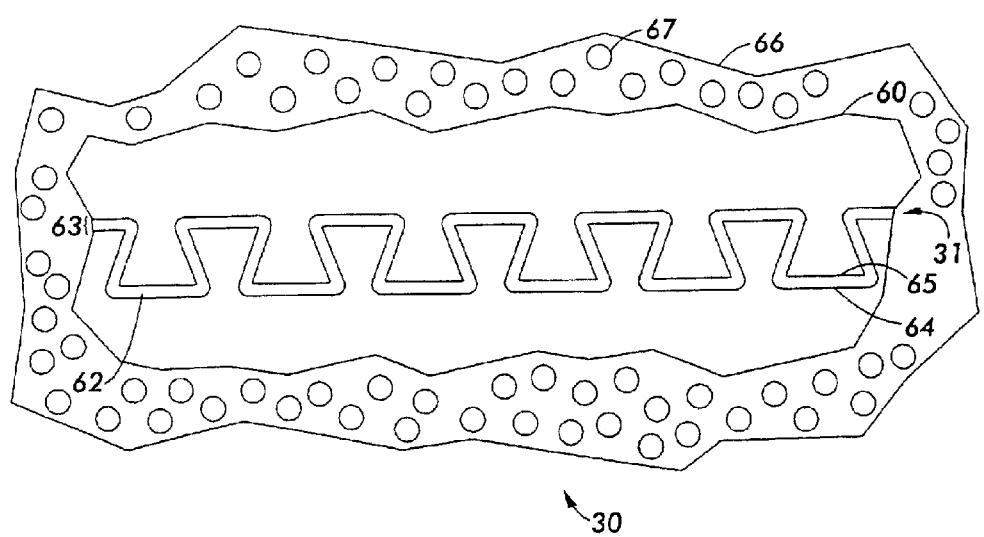
FIG. 10 is an enlarged cross-sectional view of a belt according to an embodiment of the invention.

A specific example of a belt used in combination with a charge transport layer is depicted in FIG. 10. The belt 30 comprises a substrate 60, which may comprise the charge transport materials. The belt contains seam 31 having an adhesive 63 positioned between the seam members 64 and 65. In an optional embodiment of the invention, an outer layer 66 is provided on the substrate 60. The outer layer may contain conductive fillers 67 and/or may comprise the charge transport materials. Also, the substrate may be seamless (not shown in the figures).

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I

An oxidized transport layer can be prepared comprising a charge transport molecule (from about 10 to about 50 weight percent), a binder polymer (from about 90 to about 50 weight percent) and an oligo arylamine salt or an oxidant (from about 1 to about 50 weight percent with respect to the charge transport molecule). Oxidized salts of N,N,N',N'-tetratolyl-1,1'-p-biphenyl-4,4'diamine (TTDA) can be used as the oligo arylamine salts. The synthesis of these salts can be found in U.S. Pat. No. 5,853,906, the disclosure of which is hereby incorporated by reference in its entirety. A specific example of an oxidant is 4,4'-di-t-butylphenyl iodonium hexafluoroantimonate (DBPI-AsF$_6$), which is a photoacid and requires UV exposure to activate its oxidative power. The synthesis of DBPI-AsF$_6$ can be found in U.S. Pat. No. 5,587,224, the disclosure of which is hereby incorporated by reference in its entirety.

Example II

The following coating formulation can be prepared. Into an amber bottle can be added a solvent (about 200 g of methyl ethyl ketone), a polymer binder, a fluoroelastomer such as VITON® GF (about 45 grams), N,N'-diphenyl-N,N'-di(3-methylphenyl)-1,1'-biphnyl-4,4'-diamine (TPD) (about 15 grams), and DBPI-AsF$_6$ (about 0.3 grams). The mixture can be shaken on a shaker until a solution is obtained. The resulting solution can then be coated onto polyimide (KAPTON®) substrates using a Gardner Laboratory coater. The coated layers can be air-dried for approximately two hours, followed by oven dried at 120° C. for 30 minutes to 1 hour. The dry thickness of the layers can be in the range of approximately 1 to about 3 mils (from about 25 to about 75 µm). Ultraviolate exposure can then be performed according to the procedures described in U.S. Pat. No. 5,587,224. Both the surface resistivity and the volume resistivity of the UV exposed layer are thought to be from about $10^8$ to about $10^{10}$ ohm/sq.

Example III

The following coating formulation can be prepared. Into an amber bottle is added a solvent (about 200 grams of methyl ethyl ketone), a polymer binder, polystyrene (about 45 grams), N,N'-diphenyl-N,N'-di(3-methylphenyl)-1,1'-biphnyl-4,4'-diamine (TPD) (about 15 grams), and DBPI-AsF$_6$ (about 0.3 grams). The mixture is shaken on a shaker until a solution is obtained. The resulting solution is then coated onto polyimide (KAPTON®) substrates using a Gardner Laboratory coater. The coated layers are air-dried for approximately two hours, followed by oven drying at 120° C. for 30 min to 1 hour. The dry thickness of the layers can be in the range of approximately 1 to about 3 mils (from about 25 to 75 about µm). Ultraviolate exposure is then performed according to the procedures described in U.S. Pat. No. 5,587,224. Both the surface resistivity and the volume resisitivity of the UV exposed layer are estimated to be from about $10^8$ to about $10^{10}$ ohm/sq.

Example IV

A multilayer intermediate transfer belt consisting of a DuPont resistive polyimide (KAPTON®) substrate having thereon an oxidized transport resistive layer having thereon a silicone outer layer can be prepared by web-coating a silicone layer onto the layers prepared in Examples II and II. After coating, the silicone layer can be dried and the entire layered structure can be cured at 120° C. for 3 hours, 177° C. for 4 hours and finally, 232° C. for 2 hours. The multilayer intermediate transfer belts can be particularly suitable for application in liquid xerography.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An intermediate transfer apparatus comprising:
   a) an image carrying charge retentive member capable of carrying a developed image to be transferred to an intermediate transfer member;
   b) an intermediate transfer member for accepting the developed image from the image carrying charge retentive member and transferring to an image accepting member;
   c) an image accepting member for accepting the developed image from the intermediate transfer member;
   said intermediate transfer member comprising a substrata comprising an oxidized charge transport molecule.

2. An intermediate transfer apparatus in accordance with claim 1, wherein the oxidized charge transport molecule comprises an oxidized arylamine salt.

3. An intermediate transfer apparatus in accordance with claim 2, wherein the oxidized charge transport molecule has the following formula:

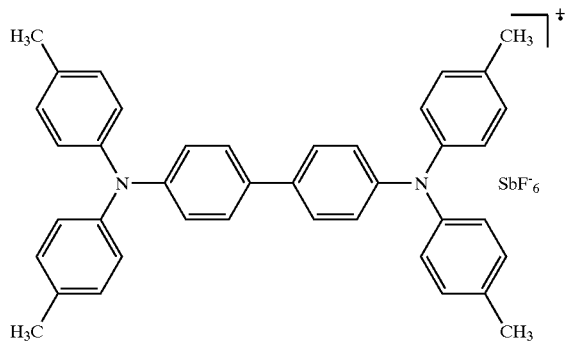

4. An intermediate transfer apparatus in accordance with claim 1, wherein the oxidized charge transport molecule comprises an oxidized oligo arylamine salt.

5. An intermediate transfer apparatus in accordance with claim 1, wherein the substrate further comprises a charge transport molecule and a polymer binder.

6. An intermediate transfer apparatus in accordance with claim 5, wherein the polymer binder is selected from the group consisting of polystyrenes, polycarbonates, polysiloxanes, polyesters, polyimides, polyurethanes, polysulfones, polyethersulfones, polyether ketones, polyamides and mixtures thereof.

7. An intermediate transfer apparatus in accordance with claim 5, wherein the polymer binder is a polyimide.

8. An intermediate transfer apparatus in accordance with claim 7, wherein the charge transport molecule is selected from the group consisting of N,N'-diphenyl-N,N'-bis(m-methylphenyl)-(1,1'-biphenyl)-4,4'-diamine and N,N,N',N'-tetra-p-tolyl-1,1'-biphenyl-4,4'-diamine.

9. An Intermediate transfer apparatus in accordance with claim 1, wherein the substrate further comprises a charge transport polymer.

10. An intermediate transfer apparatus in accordance with claim 9, wherein the charge transport polymer is selected from the group consisting or polyether carbonate, polyvinylcarbazole, triarylamine doped polycarbonate, triphenylamine-containing poly(N-methylacrylimide), polysilanes, and mixtures thereof.

11. An intermediate transfer apparatus in accordance with claim 1, wherein the substrate comprises a charge transport molecule.

12. An intermediate transfer apparatus in accordance with claim 11, wherein the charge transport molecule is selected from the group consisting of N,N'-diphenyl-N,N'-bis(m-methylphenyl)-(1,1'-biphenyl)-4,4'-diamine and N,N,N',N'-tetra-p-tolyl-1,1'-biphenyl-4,4'-diamine.

13. An intermediate transfer apparatus in accordance with claim 11, wherein the substrate further comprises a photoacid and a polymer binder.

14. An intermediate transfer apparatus in accordance with claim 13, wherein the polymer binder is selected from the group consisting of polystyrenes, polycarbonates, polysiloxanes, polyesters, polyimides, polyurethanes, polysulfones, polyethersulfones, polyether ketones, polyamides and mixtures thereof.

15. An intermediate transfer apparatus in accordance with claim 14, wherein the polymer binder is a polyimide.

16. An intermediate transfer apparatus in accordance with claim 13, wherein the photoacid is selected from the group consisting of di(p-t-butylphenyl) iodonium hexafluoroarsenate, α-sulfonyloxyketones, 2,6-dinitrobenzyl mesylate, 2,6-dinitrobenzyl pentafluorobenzenesulfonate, nitrobenzyltriphenylsilylether, phenyl naphthoquininediazide-4-sulfonate, 2-phenyl-4,6-bis-trichloromethyl-s-triazine, and mixtures thereof.

17. An intermediate transfer apparatus in accordance with claim 11, wherein the substrate further comprises a photoacid and an ultraviolet curable material.

18. An intermediate transfer apparatus in accordance with claim 16, wherein the photoacid is selected from the group consisting of di(p-t-butylphenyl) iodonium hexafluoroarsenate, α-sulfonyloxyketones, 2,6-dinitrobenzyl mesylate, 2,6-dinitrobenzyl pentafluorobenzenesulfonate, nitrobenzyltriphenylsilylether, phenyl naphthoquininediazide-4-sulfonate, 2-phenyl-4,6-bis-trichloromethyl-s-triazine, and mixtures thereof.

19. An intermediate transfer apparatus in accordance with claim 16, wherein the ultraviolet curable material is selected from the group consisting of acrylates, methacrylates, epoxies, vinyl monomers, epoxy acrylates, urethane acrylates, polyether urethane acrylates, polyester acrylates, polyether acrylates, acrylated oils, thiols, and mixtures thereof.

20. An intermediate transfer apparatus in accordance with claim 20, wherein the intermediate transfer member comprises an intermediate layer positioned on the substrate.

21. An intermediate transfer apparatus in accordance with claim 1, wherein the intermediate transfer member comprises a first end and a second end which together form a seam, wherein the seam comprises an adhesive comprising a material selected from the group consisting of charge transport molecule, an oxidized charge transport molecule, and mixtures thereof.

22. An intermediate transfer apparatus for transferring a developed image from a charge retentive surface to an image receiving member, wherein the intermediate transfer apparatus comprises a substrate having a first end and a second end, each of the first end and the second end comprising a plurality of mutually mating elements which join in an interlocking relationship to form a seam, the seam comprising an adhesive, wherein the substrate and the adhesive both comprise a material selected from the group consisting of an oxidized charge transport molecule, a charge transport molecule, and mixtures thereof.

23. An image forming apparatus for forming images on a recording medium comprising:

a charge-retentive surface to receive an electrostatic latent image thereon;

a development component to apply toner to the charge-retentive surface to develop the electrostatic latent image to form a developed image on the charge retentive surface;

an intermediate transfer member to transfer the developed image from the charge retentive surface to a receiving substrate, wherein the intermediate transfer member comprises a substrate comprising an oxidized charge transport molecule;

and a fixing component to fuse the developed image to the receiving substrate.

24. An intermediate transfer apparatus for transferring a developed image from a charge retentive surface to an image receiving member, wherein the intermediate transfer apparatus comprises a substrate having a first end and a second end, each of the first end and the second end comprising a plurality of mutually mating elements which join in an interlocking relationship to form a seam, the seam comprising an adhesive, wherein the substrate comprises a material selected from the group consisting of an oxidized charge transport molecule, a charge transport molecule, and mixtures thereof.

* * * * *